US010260922B2

(12) United States Patent
Young

(10) Patent No.: US 10,260,922 B2
(45) Date of Patent: Apr. 16, 2019

(54) METHOD OF MANUFACTURING A CORIOLIS MASS FLOW RATE SENSOR FROM A POLYMERIC MATERIAL

(71) Applicant: Malema Engineering Corporation, Boca Raton, FL (US)

(72) Inventor: Alan M. Young, Los Gatos, CA (US)

(73) Assignee: Malema Engineering Corporation, Boca Raton, FL (US)

( * ) Notice: Subject to any disclaimer, the term of this patent is extended or adjusted under 35 U.S.C. 154(b) by 0 days.

(21) Appl. No.: 15/593,899

(22) Filed: May 12, 2017

(65) Prior Publication Data

US 2017/0248456 A1 Aug. 31, 2017

Related U.S. Application Data

(63) Continuation of application No. 14/464,089, filed on Aug. 20, 2014, now Pat. No. 9,677,921.

(Continued)

(51) Int. Cl.
*B29C 65/02* (2006.01)
*G01F 1/84* (2006.01)
(Continued)

(52) U.S. Cl.
CPC ............ *G01F 1/8404* (2013.01); *B29C 65/02* (2013.01); *B29C 66/1142* (2013.01); *B29C 66/5223* (2013.01); *G01F 1/8409* (2013.01); *G01F 1/8413* (2013.01); *G01F 1/8477* (2013.01); *G01F 15/006* (2013.01); *B29C 66/3242* (2013.01); *B29C 66/63* (2013.01); *B29L 2031/752* (2013.01); *Y10T 29/49826* (2015.01)

(58) Field of Classification Search
CPC .... G01F 1/8413; G01F 15/006; G01F 1/8477; G01F 1/8409; G01F 1/8404
See application file for complete search history.

(56) References Cited

U.S. PATENT DOCUMENTS 4,768,385 A 9/1988 Cage
4,934,196 A 6/1990 Romano
(Continued)

FOREIGN PATENT DOCUMENTS

CN 87107806 A 6/1988
CN 1426531 A 6/2003
(Continued)

OTHER PUBLICATIONS

PCT International Search Report and Written Opinion, PCT Application No. PCT/US2014/051861, dated Dec. 22, 2014, ten pages.
(Continued)

*Primary Examiner* — Ryan J. Walters
(74) *Attorney, Agent, or Firm* — Fenwick & West LLP

(57) ABSTRACT

A method of manufacturing a Coriolis mass flowmeter from a polymeric material is described, in which a dynamically responsive manifold is fabricated from the same material as the flow sensor's flow-sensitive elements. The flowmeter is free of mechanical joints and adhesives. The manifold and flow-sensitive elements therefore do not slip or change their location relative one another, nor are they subject to differing degrees of thermal expansion that would otherwise undermine integrity, reliability, and/or accuracy of the boundary condition at the ends of the vibrating flow-sensitive elements.

12 Claims, 6 Drawing Sheets

Related U.S. Application Data

(60) Provisional application No. 61/868,705, filed on Aug. 22, 2013.

(51) Int. Cl.
*G01F 15/00* (2006.01)
*B29C 65/00* (2006.01)
*B29L 31/00* (2006.01)

(56) References Cited

U.S. PATENT DOCUMENTS

| | | | |
|---|---|---|---|
| 5,343,764 | A | 9/1994 | Mattar et al. |
| 5,373,745 | A | 12/1994 | Cage |
| 6,156,144 | A | 12/2000 | Lueghamer |
| 6,450,042 | B1 | 9/2002 | Lanham et al. |
| 6,776,053 | B2 | 8/2004 | Schlosser et al. |
| 6,904,667 | B2 | 6/2005 | Lanham et al. |
| 7,127,815 | B2 | 10/2006 | Schlosser et al. |
| 8,404,076 | B2 | 3/2013 | Young et al. |
| 2005/0103122 | A1 | 5/2005 | Dille |
| 2006/0048897 | A1 | 3/2006 | Temple |
| 2011/0197650 | A1 | 8/2011 | Young |
| 2013/0042700 | A1 | 2/2013 | Wang et al. |
| 2013/0174670 | A1 | 7/2013 | Young et al. |

FOREIGN PATENT DOCUMENTS

| | | |
|---|---|---|
| CN | 1882800 A | 12/2006 |
| CN | 102761153 A | 10/2012 |
| CN | 102782463 A | 11/2012 |
| EP | 0190810 A1 | 8/1986 |
| EP | 0258827 A1 | 3/1988 |
| EP | 0689931 A2 | 1/1996 |
| JP | H08-052805 A | 2/1996 |
| JP | H09-501493 A | 2/1997 |
| JP | H09-057856 A | 3/1997 |
| JP | 2003-525437 A | 8/2003 |
| JP | 2011-058950 A | 3/2011 |
| JP | 2012-025008 A | 2/2012 |
| JP | 2013-519878 A | 5/2013 |

OTHER PUBLICATIONS

Taiwanese Intellectual Property Office, Office Action, Taiwanese Patent Application No. 103129070, dated Jun. 10, 2015, six pages.
United States Office Action, U.S. Appl. No. 14/464,089, dated Sep. 9, 2016, 8 pages.
United States Office Action, U.S. Appl. No. 14/464,089, dated Feb. 26, 2016, 7 pages.
Chinese First Office Action, Chinese Application No. 2014/0046308.8, dated Nov. 25, 2016, 22 pages.
European Extended Search Report, European Application No. 14838532.1, dated Sep. 7, 2016, 9 pages.
Chinese Second Office Action, Chinese Application No. 201480046308.8, dated Aug. 11, 2017.
Japanese Office Action, Japanese Application No. 2016-536409, dated Sep. 26, 2017, 5 pages.

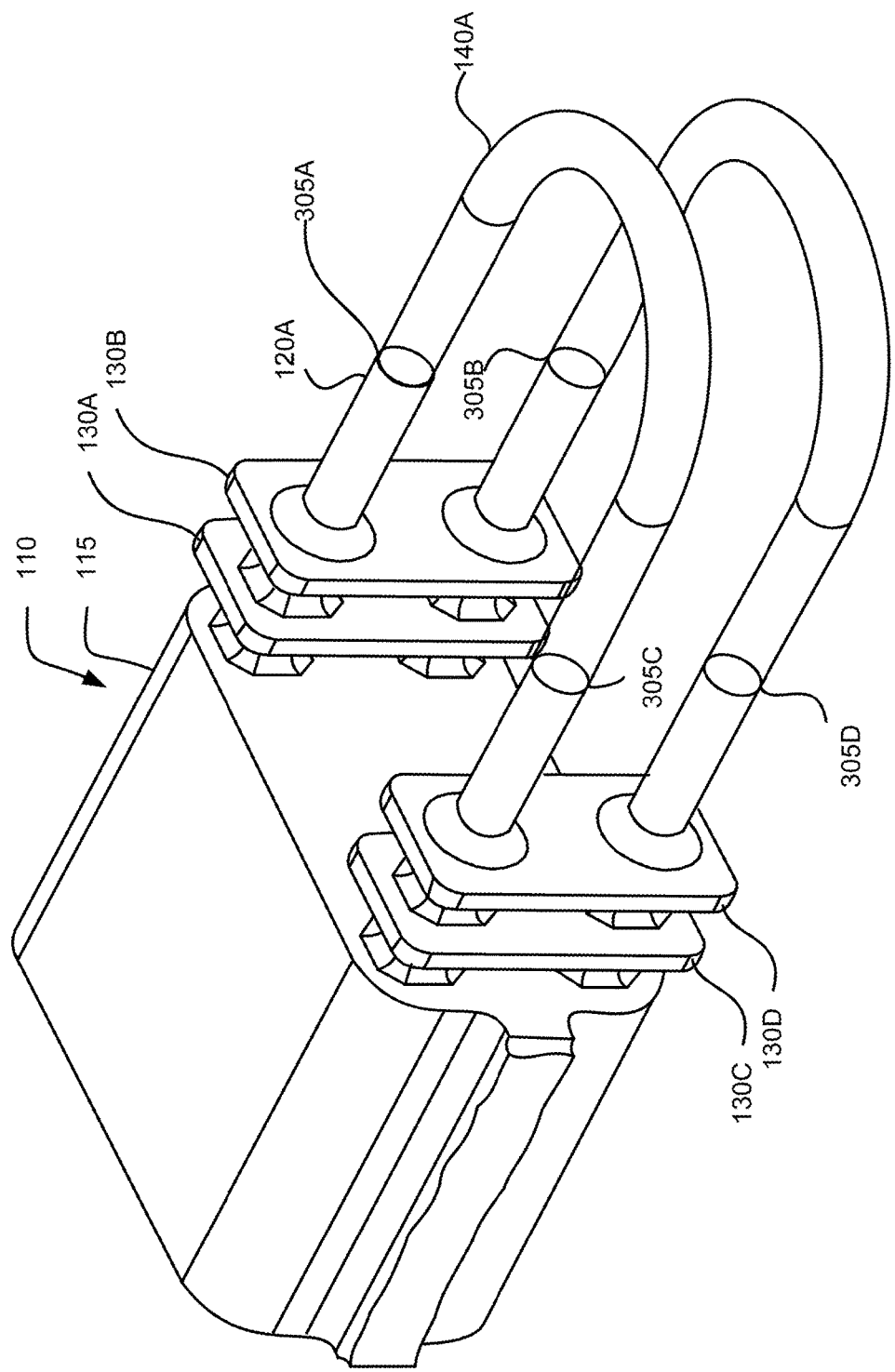

METHOD OF MANUFACTURING A CORIOLIS MASS FLOW RATE SENSOR FROM A POLYMERIC MATERIAL

CROSS REFERENCE TO RELATED APPLICATIONS

This application claims the benefit of U.S. Utility application Ser. No. 14/464,089, filed Aug. 20, 2014, which claims the benefit of U.S. Provisional Application No. 61/868,705, filed Aug. 22, 2013, each of which is incorporated by reference in its entirety.

BACKGROUND

The present disclosure relates generally to a fluid mass flow rate measurement apparatus based on the Coriolis principle and specifically to methods for manufacturing an improved Coriolis flow rate sensor constructed from a polymeric material.

Coriolis mass flowmeters can be used to measure the mass flow rate of a fluid flowing through a closed conduit. Traditional Coriolis flowmeters employ various configurations of one or two tubes (through which fluid flows) that are oscillated in a controlled manner allowing measurement of Coriolis induced deflections (or the effects of such deflections on the tube(s)) as an indication of fluid mass flow rate flowing through the sensor.

Much of the Coriolis flowmeter prior art is concerned with using metal alloy flow tubes as the flow-sensitive elements. While the prior art also indicates the theoretical possibility that plastic may be substituted for metal in a flow tube, at the same time the prior art teaches away from the use of plastic. U.S. Pat. No. 7,127,815 ("the '815 patent") states at col 2, lines 16-25 that "[t]he mere substitution of a plastic flow tube for a metal flow tube will produce a structure that looks like a flowmeter. However, the structure will not function as a flowmeter to generate accurate output information over a useful range of operating conditions. The mere assertion that a flowmeter could be made out of plastic is nothing more than the abstraction that plastic can be substituted for metal. It does not teach how a plastic flowmeter can be manufactured to generate accurate information over a useful range of operating conditions." Similar statements are found in U.S. Pat. No. 6,776,053 ("the '053 patent") from column 1, lines 58-68 to column 2, lines 1-10.

Fundamental to the successful operation of any Coriolis flowmeter is that the flow-sensitive element (e.g., a tube in the '815 and '053 patents) must be fixedly attached to a supporting base in such a manner that a fixed, stable, and unchanging boundary condition is established for the ends of the vibrating flow-sensitive element. The '815 and '053 patents describe methods of fabricating a Coriolis flowmeter with at least one polymer (e.g., PFA (poly (perfluoroalkoxy))) tube attached to a metal support using a cyanoacrylate adhesive. Thus, the stability of the joint and the quality of the boundary condition are limited by the adhesive, which is the interface most susceptible to degradation during operation.

Another aspect of the adhesive joint described in the '815 and '053 patents is that the integrity of the coupling of the tube to the metal base is not necessarily unyielding and unchanging because of the use of the adhesive. Rather, the coupling could deteriorate over time from continuous vibration of the tube causing the adhesive joint to crack or otherwise degrade. Additionally, differential thermal expansion amongst the various materials of construction (e.g., the PFA tube, the cyanoacrylate adhesive, and the metal base) will impair the integrity of the coupling of the tube to the metal base creating an unstable boundary condition resulting in uncontrolled vibration characteristics to such an extent that performance of the device could be compromised.

The '815 and '053 patents describe properties of PFA tubing which, to facilitate binding of the cyanoacrylate adhesive to the PFA tube, is subjected to etching (a process referred to in the '815 patent) that requires submersing and gently agitating PFA tubes in a heated bath containing glycol-diether. This etching process adds cost and complexity to the fabrication of the flowmeter and may not necessarily yield tubing suitable for flowmeter fabrication on a consistent basis.

Other art that describes Coriolis flowmeters with plastic flow tubes has different problems. U.S. Pat. No. 6,450,042 ("the '042 patent"), U.S. Pat. No. 6,904,667, and U.S. Patent Application Publication No. 2002/0139199 describe methods of fabricating a Coriolis flowmeter via injection molding, and forming the flow path from a core mold made from a low-melting point fusible metal alloy containing a mixture of Bismuth, Lead, Tin, Cadmium, and Indium with a melting point of about 47 degrees Celsius. The '042 patent asserts that " . . . with the possible exception of a driver and pick offs, and case, the entirety of the flowmeter is formed by injection molding." U.S. Pat. No. 6,450,042, column 2, lines 65-67. This method of fabrication presents significant problems and limitations. During the injection molding process, hot plastic is injected into a mold at temperatures that can exceed 350 degrees Celsius at pressures exceeding 5000 psi. When fabricating thin-wall or small diameter flow passageways (e.g., 2 mm to 4 mm internal diameter with wall thickness <2 mm) such melt temperatures and pressures will likely damage the comparatively narrow (and flexible) fusible metal core (e.g., possibly melting its surface) resulting in deformation and contamination of the flow passageways to such an extent that the device could be rendered unusable.

Furthermore, in semiconductor, pharmaceutical, bio-pharmaceutical, or other critical high-purity process applications, it is important to avoid metallic contamination, however infinitesimal. Unlike a solid core (e.g., stainless steel), the comparatively soft fusible core described in these references can partially melt or abrade during the injection molding process, allowing metal atoms to mix and become embedded within the injected plastic, thus permanently contaminating the flow passageway rendering the device unsuitable for high-purity semiconductor manufacturing applications.

Furthermore, in plastic injection molding processes, it can be desirable that various molded features have similar thicknesses because otherwise the molded part may not form properly (due to volume changes of the part during cooling). With reference to the '042 patent, this means that all structural features of the Coriolis flowmeters (e.g., wall thickness of the flow-sensitive elements, isolation plates (or "brace bars"), inlet and outlet flanges, manifold walls) all have similar thicknesses. But consequences of forming the entirety of the flowmeter by injection molding are structural and/or dynamic design limitations or compromises that could adversely limit flowmeter performance.

U.S. Pat. No. 8,404,076 and U.S. Patent Application Publication No. 2013/0174670 both describe inventions including a structure employing flow-sensitive elements fabricated from a polymeric material in which the flow passageways are formed out of a single piece of elastic polymer material. The flow passageways are fabricated by machining (e.g., drilling) them in the single polymer piece from an exterior surface after attachment of the single polymer piece to a manifold. After drilling, the external holes from the drilling are sealed. Alternatively, the structure can be fabricated by injection molding, the flow passageways being formed by a combination of a solid core employed within the mold and/or secondary drilling operations after the part is removed from its mold.

One disadvantage of this is method is that, due to fabrication limitations, forming the flow passageways with solid cores within a mold and/or drilling may necessarily require larger than desired wall thickness of the flow passageways (e.g., >1 mm). Larger wall thicknesses can limit a device's flexibility and hence measurement sensitivity at low flow rates. Another disadvantage is that the presence of corners at the intersection of adjacent linear-segments (e.g., square "U" or triangular shapes) can become sites for the accumulation of solids when measuring slurries. This accumulation will cause increased pressure loss compared to that of a curvilinear structure not having sharp bends or discontinuities in the flow path.

SUMMARY

A Coriolis mass flowmeter is manufactured from a polymeric material comprising a dynamically responsive manifold fabricated from the same material as the flow sensor's flow-sensitive elements and free of mechanical joints and adhesives. A device fabricated by this method produces an unyielding, fixed boundary condition for the vibrating flow-sensitive element(s). The flowmeter thus avoids undesired changes or variability in relative location between the flow-sensitive elements themselves and/or between the flow-sensitive elements and the dynamically responsive manifold caused by slipping and/or differential thermal expansion/contraction that would otherwise undermine the long-term integrity and reliability of the boundary condition at the ends of the vibrating flow-sensitive elements.

Furthermore, flowmeters fabricated entirely from polymeric materials using the fabrication methods described below avoid problems from polymeric flowmeters fabricated using other methods. For example, the flow passageways (and other elements of the flowmeter) are fabricated by molding or otherwise shaping polymer tubes. This avoids the use of low-melting point fusible metal alloys that could permanently contaminate the flow passageway(s) with metal atoms. Thus, the risk of rendering the device unsuitable for applications involved with high-purity semiconductor manufacturing is avoided.

Also, because no post fabrication machining is needed to fabricate the flow passageways themselves, the flow-sensitive members can be fabricated from polymeric tubing of a curvilinear shape with comparatively thin-walls ($\leq 1$ mm). The curvilinear shape and thin walls allow enhanced measurement sensitivity at low flow rates. The curvilinear shape also eliminates sharp corners inside the flow passageways, which otherwise could become sites of accumulation for slurry solids. By preventing this accumulation, the flowmeter fabricated according to the methods below avoids this contamination source and avoids a pressure drop that is induced by accumulation of material within a flow passageway.

BRIEF DESCRIPTION OF THE DRAWINGS

FIG. 3 is an illustration of a Coriolis flow sensor subassembly depicting "U"-shaped tubing welded to a dynamically responsive manifold, in an embodiment.

The figures depict various embodiments of the present disclosure for purposes of illustration only. One skilled in the art will readily recognize from the following discussion that alternative embodiments of the structures and methods illustrated herein may be employed without departing from the principles described herein.

DETAILED DESCRIPTION

Overview

Embodiments include methods of manufacturing a Coriolis mass flowmeter from a polymeric material, in which a dynamically responsive manifold is fabricated from the same material as the flow sensor's flow-sensitive elements and is free of mechanical joints and adhesives. Fabricating a flowmeter according to these methods provides an unyielding, fixed boundary condition at the dynamically responsive manifold for the vibrating sensitive element, improving measurement sensitivity.

In one embodiment, a dynamically responsive manifold is fabricated from the same material as the flow-sensitive elements of the flowmeter. As described below, the manifold is free of adhesives and other mechanical joints (i.e., a joint between two physically distinct elements joined by, for example, an adhesive, a clamp, an interference fit, a hose, a bellows, etc.). A benefit of avoiding mechanical joints and adhesives is that the manifold and flow-sensitive elements do not slip or change their location relative one another, nor are they subject to differing degrees of thermal expansion that would otherwise undermine integrity, reliability, and/or accuracy of the boundary condition at the ends of the vibrating flow-sensitive element(s).

The embodiments described below also recite methods in which a dynamically responsive manifold and the corresponding flow-sensitive elements are both fabricated without using low-melting point fusible metal alloys. A benefit of this method is eliminating the risk of contamination of the flow passageway(s) with metal atoms, which otherwise would render the device unsuitable for applications involved in applications (e.g., high-purity semiconductor manufacturing or bio-pharmaceutical processes).

Furthermore, the embodiments described below are used to fabricate a manifold and its corresponding flow-sensitive elements from the same polymeric material. The flow-sensitive element(s) are, in some examples, fabricated from polymeric tubing formed in a curvilinear shape with comparatively thin-walls ($\leq 1$ mm). A benefit of these features is that the flowmeter has improved measurement sensitivity, even at low flow rates. Furthermore, the flow-sensitive members are, in some cases, fabricated from commercially available polymeric tubing formed in a curvilinear shape without sharp corners or abrupt changes in direction. A benefit of this is that sites of possible accumulation for slurry solids (which can cause increased pressure drop or become dislodged creating particle contamination) are eliminated from the fabricated structure.

Structure of Coriolos Flowmeters

Figure 1:
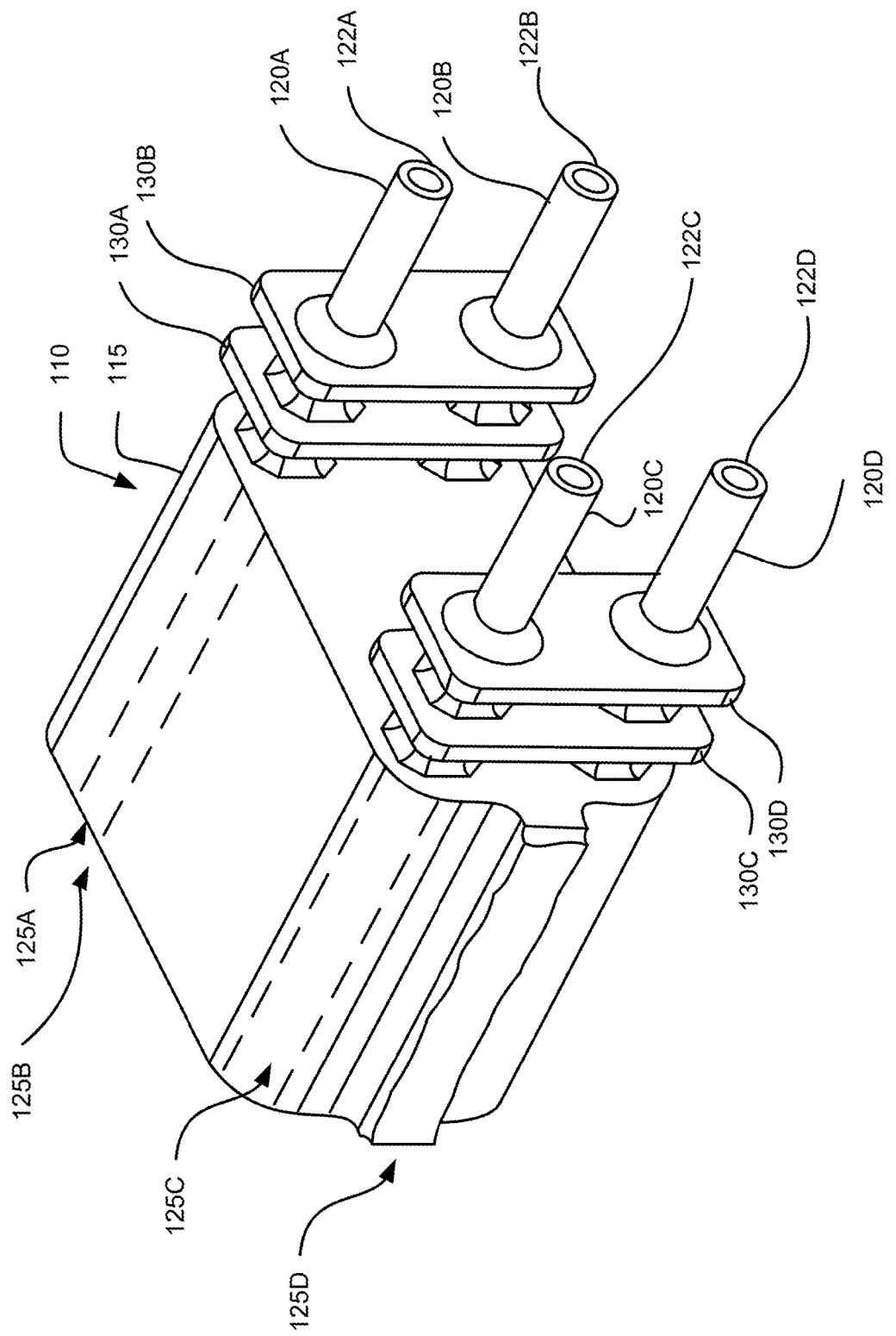
FIG. 1 is an illustration of a dynamically responsive manifold structure fabricated from a polymeric material, in an embodiment.

FIG. 1 illustrates a dynamically responsive manifold 110 fabricated using methods of the present disclosure. The manifold 110 includes a body 115, tubular port extensions 120A-D (collectively 120), manifold fluid passageways 125A-D (collectively 125), and isolation plates 130A-D (collectively 130).

The body 115 provides a structure onto which the tubular port extensions 120 and isolation plates 130 are connected and through which the fluid (whose flow is measured) passes. In one embodiment, the body 115 is fabricated from a polymeric material by CNC (computer numerical control) machining from a single piece of polymeric material. In other embodiments, the body is fabricated 115 from a polymeric material by injection molding, or other molding operation. In this latter case, manifold flow passageways 125 are either molded in situ or bored in a separate machining operation after molding of the body 115.

In some embodiments, the body 115 and the tubular port extensions 120, manifold fluid passageways 125, and isolation plates 130 are fabricated together, either using CNC machining from a single piece of polymeric material or by molding. Conventional Coriolis flowmeters fabricate the body and isolation plates separately and then attach them later. The body 115 (and any elements of the dynamically responsive manifold 110 fabricated with the body) can be fabricated from one of any a number of polymeric materials, including but not limited to, commercially available polymeric materials (e.g., PFA, poly(ether ether ketone) (PEEK), poly(vinylidene fluoride) (PVDK), poly(tetrafluoroethylene) (PTFE), poly(fluorinated ethylene propylene) (FEP) or custom polymers and polymer blends.

The tubular port extensions 120 connect to the body 115 and the isolation plates 130 and ultimately connect to the flow-sensitive members 140. Thus connected, the tubular port extensions 120 vibrate as continuous extensions of the flow-sensitive members. A weld surface 122 of each tubular port extension 120 connects to an open end of the corresponding flow-sensitive member (shown in FIG. 2 and described below), thus placing the flow-sensitive members in fluid communication with corresponding manifold fluid passageways 125. The tubular port extensions 120 have the same nominal outside and inside diameters and dimensional tolerances as the flow-sensitive members, typically +/−0.2 mm. These tolerances facilitate precise alignment and welding of the tubular port extensions to the flow-sensitive members, as described below. The tubular port extensions 120 are formed integral with the body 115 (either by machining or molding). That is, the tubular port extensions 120 are formed with the body 115 and thus joined to the body seamlessly as a single structure that is without a separate or distinct mechanical connection between the tubular port extensions and the body. As described below, welding is used to add components (i.e., the flow-sensitive members) in a way so that they are also integral to the body 115.

The isolation plates 130 of the dynamically responsive manifold 110, connected to the tubular port extensions 120, establish the boundary condition for vibration of the flow-sensitive members 140 by providing fixed nodes from which vibration is measured. The isolation plates 130 influence the flowmeter's dynamic frequency response characteristics.

For example, when operating a Coriolis flowmeter, the two flow-sensitive members 140 are vibrated opposite one another in phase opposition (i.e., "anti-phase") at their natural frequency, resulting in motion akin to that of a tuning fork. Additionally, the two flow-sensitive members 140 may also vibrate together in unison (i.e., symmetrically "in-phase"). Depending on the rigidity of the connection between the flow sensitive members 140 and the body 115 and the material and dimensions of the flow-sensitive members 140, the natural frequency of the in-phase vibration can be close (if not identical) to that of the anti-phase vibration. The closer the two frequencies, the greater the risk of flowmeter instability because vibrational excitation energy will be shared uncontrollably between the two (in-phase and anti-phase) vibrational modes. When operating a Coriolis flowmeter at its natural frequency, the natural frequency of all vibrational modes should be sufficiently well-separated so as to not interfere with the sensor's operation.

The isolation plates 130 create well-defined vibrational boundary conditions that cause the frequency of the in-phase and anti-phase modes to be separated by allowing different portions of the flow-sensitive elements 140 (which have different masses and moments of inertia) to participate in the in-phase and anti-phase vibrations. The dimensions and thickness of the isolation plates 130 also influence the flowmeter's frequency response because the isolation plates 130 affect the stiffness of the vibrating flow-sensitive elements 140 only in the anti-phase mode. Importantly, the isolation plates 130 directly influence a sensor's frequency response characteristics to allow for satisfactory performance. Because of the mechanical challenge and difficulty of attaching isolation plates 130 near open ends of the flow-sensitive members 140, these elements are attached to the manifold via tubular port extensions 120.

Unlike Coriolis flowmeters of the prior art, which attach physically distinct isolation plates (also known as "brace bars") to the tubular port extensions or flow-sensitive members (for example, using an adhesive, as described above), the isolation plates 130 of the present disclosure are integral (that is, connected seamlessly so as to produce a single structure having different elements) with the manifold 110 (and the body 115) and the tubular port extensions 120. A benefit of this integral structure is simpler manufacturing and a more unyielding, constant boundary condition for terminating the vibration of the tubular flow-sensitive element(s) regardless of tube shape. Fabricating a flowmeter with integrated isolation plates 130 on the manifold also allows for greater design flexibility (e.g., isolation plate thickness and separation) permitting any of a variety of tube shapes to be welded to the dynamically responsive manifold without having to separately attach isolation plates to the tubes.

The isolation plates 130 also provide vibrational isolation from external sources (e.g., the structure to which the dynamically responsive manifold 110 is mounted), and allow frequency separation between the modes of the two flow-sensitive members, whether vibrating in anti-phase or in-phase modes. If suitable frequency separation between these two modes did not exist, the sensor would become unstable during its operation. Regardless, the dynamically responsive manifold 110 comprises a single, seamless structure that includes the tubular port extensions 120 and the isolation plates 130 integral with the body 115.

Figure 2:
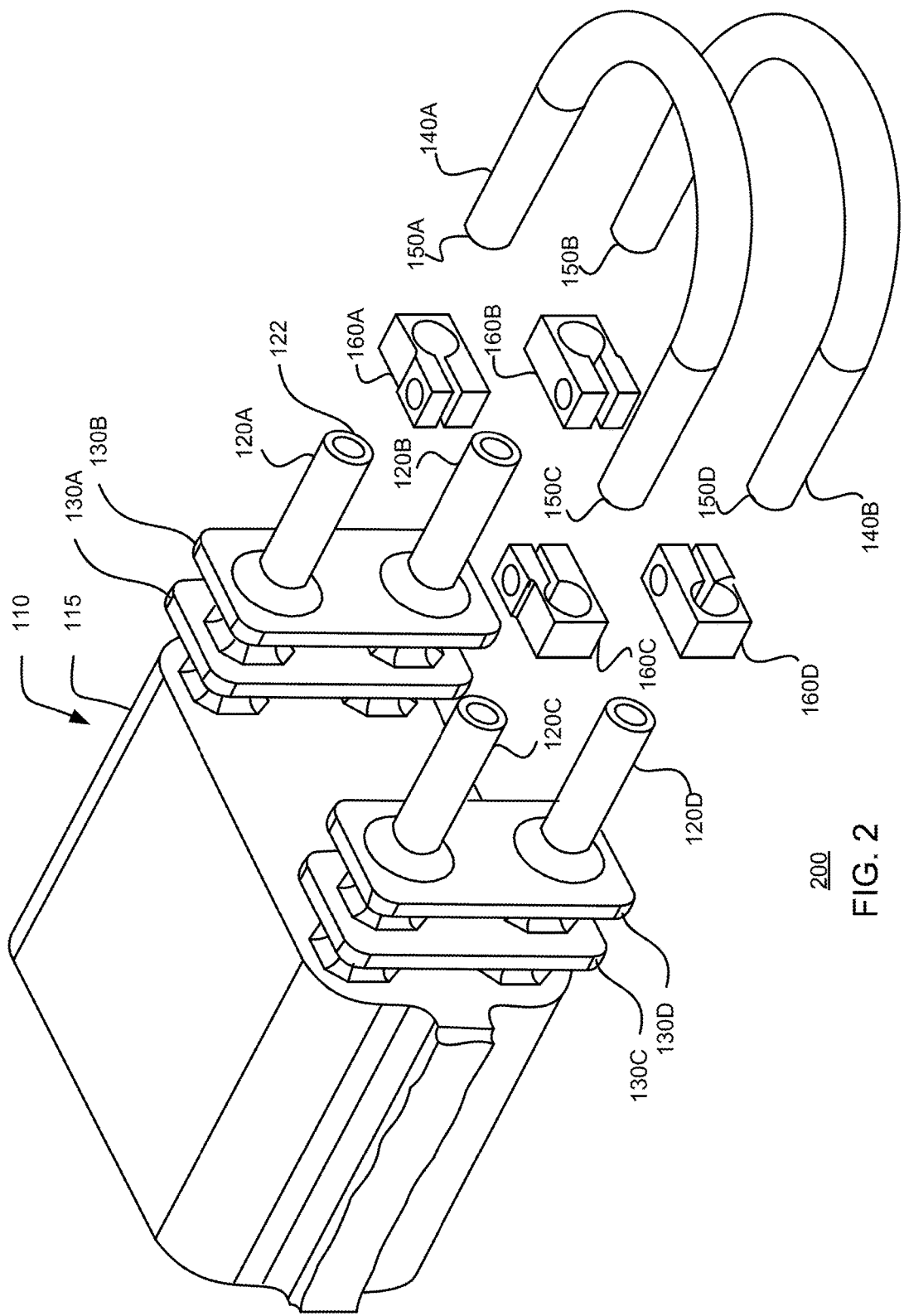
FIG. 2 is an exploded view of a flow sensing structure depicting a dynamically responsive manifold and a pair of "U"-shaped flow tubes fabricated from a polymeric material, in an embodiment.
Figure 4C:
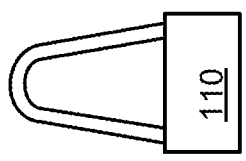
FIGS. 4A-E are schematic illustrations of various possible tube shapes of Coriolis flow-sensitive members welded to a dynamically responsive manifold, in embodiments.
Figure 4E:
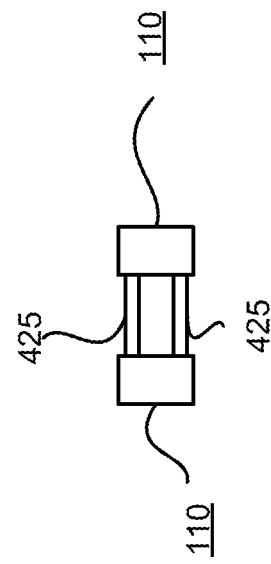
Figure 4B:
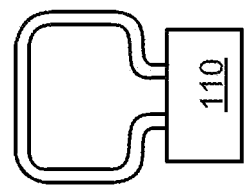
Figure 4D:
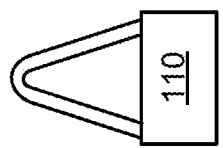
Figure 4A:
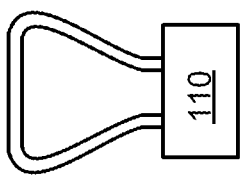

FIG. 2 illustrates an "exploded" view of a Coriolis flow sensor sub-assembly 200. In addition to the elements of the dynamically responsive manifold 110 described above, FIG.

2 also shows flow-sensitive members 140A and 140B (collectively 140) and tabs 160A-D (collectively 150).

Plumbing connections (not shown) configured at the rear of dynamically responsive manifold 110 allow fluid to flow through each flow-sensitive member 140 in a hydraulically serial or parallel manner via the manifold fluid passageways 125. Open ends 150A and 150C of flow-sensitive member 140A are each welded to the corresponding weld surface 122 of tubular port extensions 120A and 120C. Similarly, open ends 150B and 150D of tube 140B are each welded to the corresponding weld surface 122 of tubular port extensions 120B and 120D. The welding operation of each of the flow-sensitive members to the corresponding tubular port extensions is, in some embodiments, performed simultaneously. This aspect of a fabrication method is described below in more detail in the context of FIG. 5.

FIG. 2 also shows tabs 160A-D (collectively 160), which are used to facilitate mounting of motion responsive devices (not shown) to the flow-sensitive members 140. The tabs 160 slide on to, clamp, or are otherwise attached to the flow-sensitive members 140. The tabs 160 are also fabricated from a polymeric material, but not necessarily of the same material used to fabricate other elements of the dynamically responsive manifold 110. For example, the material used to fabricate the tabs 160 may be different from that of the flow-sensitive members 140 and may have a thermal expansion coefficient less than that of the material used to fabricate the flow-sensitive members. A benefit of this is that the tabs 160 are more likely to maintain contact with the flow-sensitive members 140 as the temperature of the system changes, thus maintaining measurement accuracy.

FIG. 3 illustrates a view of an assembled Coriolis flow sensor sub-assembly 300. FIG. 3 includes the elements described above, including labeled elements of body 115, tubular port extension 120A, isolation plates 130A and 130B, and the flow-sensitive member 140A, which are labeled for clarity of explanation. In addition to these previously described elements, FIG. 3 also includes polymer joint 305A. The polymer joint 305A is an adhesive-free junction between the tubular port extension 120A and the open end 150A of the flow-sensitive member 140A. Other polymer joints 305B-305D are shown in FIG. 3 between the other tubular port extensions 120 and their corresponding flow-sensitive member open ends. The polymer joints are referred to collectively as 305.

As mentioned above, polymer joint 305 joins elements fabricated from the same polymer material because the various elements of the dynamically responsive manifold 110 and the flow-sensitive members 140 are all fabricated or molded from the same polymeric material. Thus, the tubular port extensions 120 and the open ends 150 of the flow-sensitive members 140 need only be heated to within a weld temperature range (determined according to the polymeric material used) and put into contact with one another to form the polymer joint 305. In some embodiments, it is beneficial to weld all of the open ends 150 to all of the tubular port extensions 120 simultaneously. This is beneficial because it is more likely to produce a flowmeter in which the moments of inertia in both flow-sensitive members are sufficiently close so as to be balanced. If the welds are made separately, it is more likely that at least one dimensional tolerance (+/−0.2 mm) of a weld will not be met, thus creating a vibrating structure that would not have balanced moments of inertia because the lengths of the flow-sensitive members (constituting the vibrating structure) would be different.

Inequality in moments of inertia of each flow-sensitive member would result in a dynamically unbalanced structure adversely affecting the accuracy of the flowmeter (and zero-flow offset stability). For example, an unbalanced structure is more sensitive to fluid and ambient temperature variations and more susceptible to external vibrations, thus rendering the measurements of the device less accurate, less precise, and less reliable. The details of the fabrication method for producing flow-sensitive members with balanced moments of inertia are described in more detail below.

FIGS. 4A-E presents plan views of a variety of shapes 405-425 of flow-sensitive elements 140 that could be welded to a dynamically responsive manifold 110 (represented schematically as a rectangular block). Any of the depicted example tube shapes 405-425 could be selected as a matter of design choice to meet the requirements of a particular flow measurement application. One benefit of fabricating a dynamically responsive manifold 110 according to the present disclosure is that it is either possible or more convenient to integrate any of a variety of tube shapes for use as flow-sensitive members without having to design an entirely new manifold 110.

Example Coriolos Flowmeter Manufacturing Method

Figure 5:
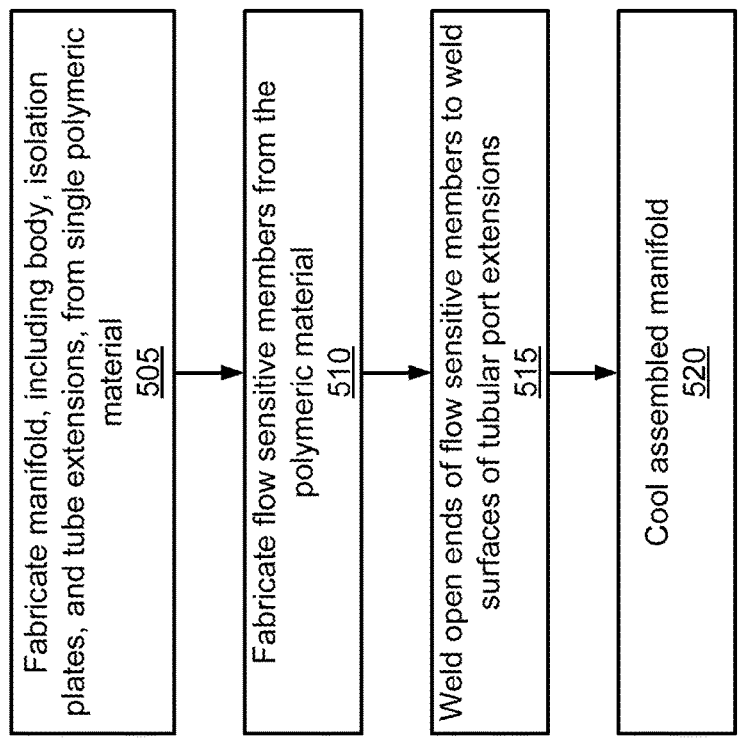
FIG. 5 is a method flow diagram of an example method of fabricating a Coriolis flowmeter from a single polymeric material, in an embodiment.

FIG. 5 is a method flow diagram of an example method 500 for fabricating a Coriolis flowmeter according to the present disclosure. The manifold 110 is fabricated 505 from a single polymer material either through CNC machining or through molding (e.g., injection molding). As described above, the manifold 110 as fabricated includes not only the body 115, but also isolation plates 130 and tubular port extensions 120. The polymer used can be any of a variety of commercially available polymers (e.g., PFA, PEEK, PVDF, PTFE, FEP) or a custom polymer or polymer blend. The manifold flow passageways 125 through the body 115 can optionally be fabricated with the manifold in a single step or drilled (or otherwise made) subsequent to the fabrication of the manifold body 115.

The flow-sensitive members are fabricated 510. The flow-sensitive members are fabricated using the same polymer material used to fabricate 505 the manifold. The flow-sensitive members are, in some cases, commercially available tubes that are formed into a particular shape (such as those shown in FIG. 4). Shaping includes heating the tubing to near (or at or slightly above) the glass transition temperature of the polymer, forming the tube into a desired shape (for example, using a plate or other mold with the desired shape machined into it), maintaining the temperature to allow any mechanical stresses within the shaped tube to dissipate, and cooling the flow-sensitive member in a controlled manner. This heating performed during the shaping process is also known as annealing, the temperatures and temperature profile of which will vary depending on the polymeric material used.

The tubular flow-sensitive members can be fabricated from commercially available (or custom-fabricated) polymeric tubing (including but not limited to PFA, PEEK, PVDF, PTFE, FEP) in order to meet the design requirements of a particular flow measurement application and to match the polymer material of the manifold. While the inner and outer diameters of the flow-sensitive members (and corresponding matching tubular port extensions) can be any values, the dimensional tolerances of these diameters (and/or a wall thickness) are preferably within a range of a few tenths of a millimeter. These tolerances facilitate accurate alignment of the flow-sensitive members with the isolation plates and tubular port extensions during welding.

Open ends of the flow-sensitive members are welded 515 to the welding surfaces of the tubular port extensions. Open ends of the tubular port extensions and open ends of the flow-sensitive are heated to within a weld temperature range that is a function of the selected polymer. This can be performed using, for example, a resistive heating element (e.g., a ceramic or metallic heating element) that is inserted between the physically proximate welding surfaces of the tubular port extensions and the open ends of the flow-sensitive members, thus locally heating the surfaces to be welded. Once the welding surfaces and open ends reach the desired temperature, the heating element is removed and the open ends and welding surfaces are brought into contact simultaneously. As mentioned above, a benefit of simultaneous welding is the lengths of the flow-sensitive members will be nearly the same so that, when used in the flowmeter, the flow-sensitive members have the same (or approximately the same) moments of inertia. Similarly, the simultaneous welding facilitates proper positioning of the flow-sensitive members so that dimensions based on the location of the flow-sensitive members are within +/−0.2 mm. Other dimensions, such as inner and outer diameters also are preferably within +/−0.2 mm of the target dimension. Another benefit of welding is that is flows polymer from both sides of the weld together, thus integrating the flow sensitive members 140 with the tubular port extensions 120 seamlessly, without a separate mechanical joint that can degrade or reduce flow meter performance.

A fixture can be used to hold the flow-sensitive members to facilitate simultaneous and accurate welding. For example, the flow-sensitive members are optionally placed in a fixture configured to position the opens ends of flow-sensitive members precisely relative to one another and relative to the welding surfaces of the tubular port extensions so that dimensional tolerances are met. The fixture is also configured to translate the flow-sensitive members precisely and in a controlled way. Examples of such fixtures include translation tables used on machine tools, including those with surfaces of known planarity (e.g., planar to within 0.0001 of an inch).

Figure 6:
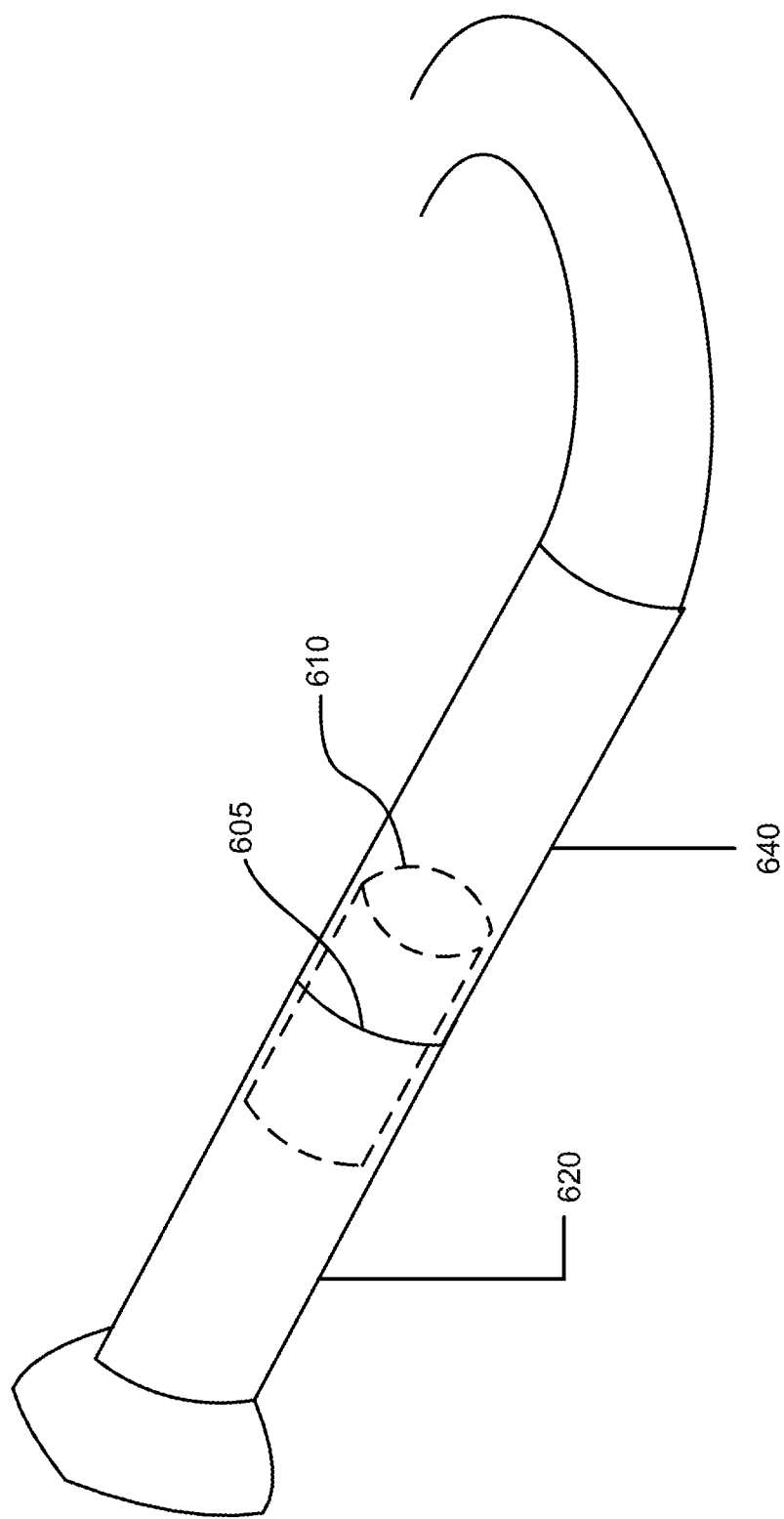
FIG. 6 is an illustration of a pin inserted into a flow sensitive-member to prevent polymer from entering the flow-sensitive member during welding, in an embodiment.

In some examples, one or more pins can be inserted through a manifold fluid passageway 125 of the body 115 to a location inside the flow-sensitive and tubular port extension that corresponds to the polymer joint (shown in FIG. 3 as element 305). An example of this is shown in FIG. 6, in which the pin 610 is within the tubular port extension 620 and the flow-sensitive member 640 at a location corresponding to the polymer joint 605. Typically the pin 610 will be in intimate contact with the inner surfaces of the tubular port extension 620, the flow-sensitive member 640, and the polymer joint 605. However, some separation between the pin 605 and these surfaces is shown in FIG. 6 for clarity. The pin, made from any non-contaminating material that is mechanically and chemically stable in the weld temperature range of the polymer used to fabricate the manifold and flow-sensitive members, is used to prevent any extrusion or flow of polymer from the polymer joint 305 to the interior of the flow passageway. This preserves the unobstructed continuity of the flow passageway needed for accurate measurements. The pin is then removed after solidification of the polymer joint 305.

The assembled manifold 110 is then cooled 520 in a controlled way to allow mechanical stresses introduced during any of the foregoing steps to dissipate. The temperatures and temperature vs. time profile of the cooling is a function of the polymer used to fabricate the assembled flowmeter.

Another benefit of the annealing process is to reduce the risk of excessive polymer flow and warping from excessive thermal gradients across the tubular parts during an uncontrolled cooling process or a faster cooling rate. This helps maintain dimensional control of the tubular elements to within several thousands of an inch. This is used to preserve the substantially equal moments of inertia in each vibrating flow-sensitive member.

Additional Considerations

The foregoing description of the embodiments of the disclosure has been presented for the purpose of illustration; it is not intended to be exhaustive or to limit the claims to the precise forms disclosed. Persons skilled in the relevant art can appreciate that many modifications and variations are possible in light of the above disclosure.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the invention, which is set forth in the following claims.

What is claimed is:

1. A method for fabricating a Coriolis flowmeter from a single polymer material, the method comprising:
   fabricating a dynamically responsive manifold from a first polymer material, the dynamically responsive manifold comprising:
      a body,
      at least four tubular port extensions integral to the body, each tubular port extension including a weld surface, and
      at least one isolation plate integral to the body and the at least four tubular port extensions;
   forming at least two flow-sensitive members by shaping at least two tubes to a predetermined shape, the at least two tubes made from the first polymer material, each flow-sensitive member including two open ends corresponding to two of the at least four tubular port extensions; and
   welding each open end of the at least two flow-sensitive members to a corresponding weld surface of one of the at least four tubular port extensions,
   wherein the at least two flow-sensitive members and the at least four tubular port extensions have a dimensional tolerance, and
   wherein shaping at least two tubes to a predetermined shape comprises:
      heating the respective tube to a temperature near a glass transition temperature of the first polymer material,
      forming the tube into the predetermined shape,
      maintaining the temperature for a time period, and
      cooling the shaped tube.

2. The method of claim 1, wherein welding each open end of the at least two flow-sensitive members to the corresponding weld surface of one of the at least four tubular port extensions occurs simultaneously.

3. The method of claim 1, wherein the welding further comprises:
   locally heating the weld surface of each of the at least four tubular port extensions to within a weld temperature range of the first polymer material;

locally heating each open end of the at least two flow-sensitive members to within the weld temperature range of the first polymer material; and joining each open end to the corresponding weld surface simultaneously while each weld surface and each open end are within the weld temperature range of the first polymer material.

4. The method of claim 1, wherein the tubular port extensions and the flow-sensitive members have an outside diameter that is approximately the same.

5. The method of claim 4, wherein a tolerance of the outside diameter is +/−0.2 mm at each weld.

6. The method of claim 1, wherein the welding forms an adhesive-free and contamination-free junction.

7. The method of claim 1, further comprising: temporarily inserting a pin, during welding, to a location that is inside the at least two flow-sensitive members and the corresponding tubular port extension, the location corresponding to a polymer joint, the pin in intimate contact with the polymer joint to prevent polymer from the polymer joint from flowing into the flow-sensitive member.

8. An apparatus, comprising:
a dynamically responsive manifold, comprising:
  a body of a first polymer material,
  at least four tubular port extensions of the first polymer material, the at least four tubular port extensions integral to the body, and
  at least one isolation plate of the first polymer material, the at least one isolation plate integral to the body and the at least four tubular port extensions;
at least two flow-sensitive members formed by shaping at least two tubes to a predetermined shape, the at least two tubes made from the first polymer material, each of the at least two flow-sensitive members having a first end and a second end, each of the first ends and the second ends corresponding to one of the at least four tubular port extensions, the at least two flow-sensitive members and the at least four tubular port extensions having a dimensional tolerance; and
at least four polymer welds, each of the at least four polymer welds connecting one of the first ends or one of the second ends of the at least two flow-sensitive members to the corresponding one of the at least four tubular port extensions,
wherein shaping at least two tubes to a predetermined shape comprises:
  heating the respective tube to a temperature near a glass transition temperature of the first polymer material,
  forming the tube into the predetermined shape,
  maintaining the temperature for a time period, and
  cooling the shaped tube.

9. The apparatus of claim 8, wherein a wall thickness of each of the at least four tubular port extensions and each of the at least two flow-sensitive members is less than one millimeter.

10. The apparatus of claim 8, wherein an inner diameter of the at least two flow-sensitive members is between two millimeters and four millimeters.

11. The apparatus of claim 8, wherein a dimensional tolerance of each of the at least four polymer welds is within 0.2 millimeters.

12. The apparatus of claim 8, wherein the at least one isolation plate is disposed between weld surfaces of the at least four tubular port extensions and the body of the dynamically responsive manifold.

\* \* \* \* \*